Patented June 5, 1945

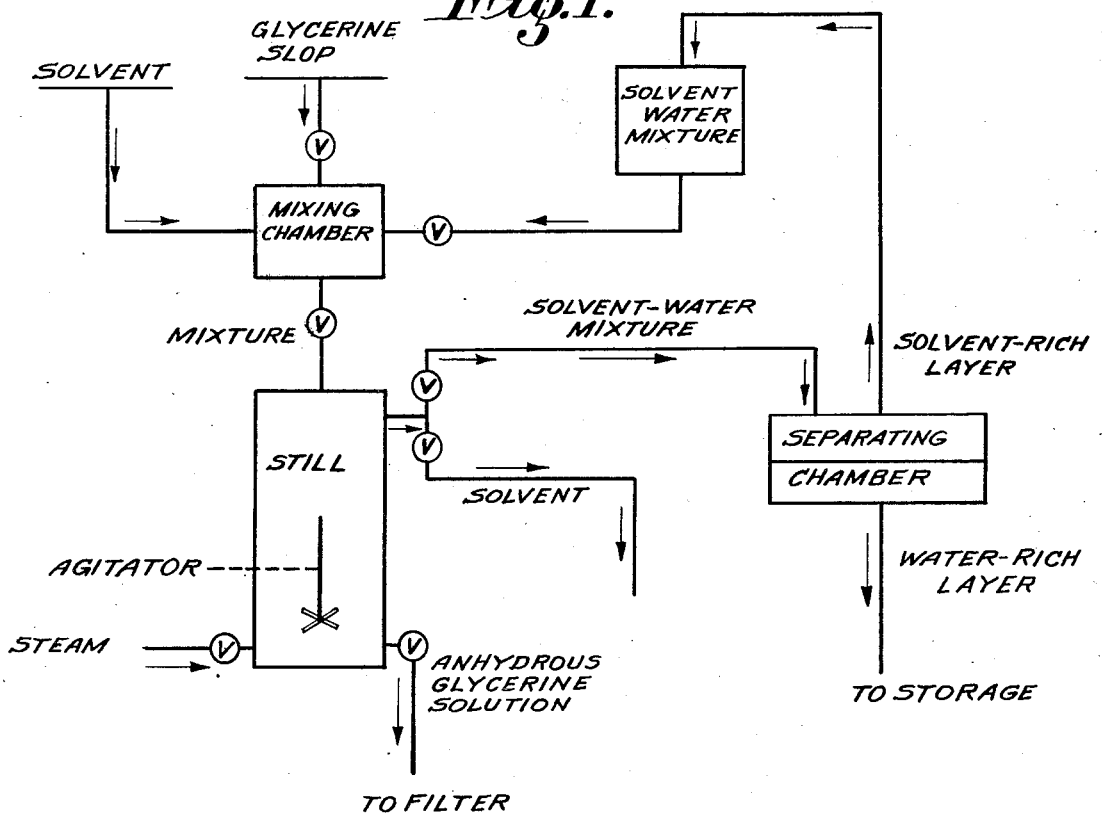
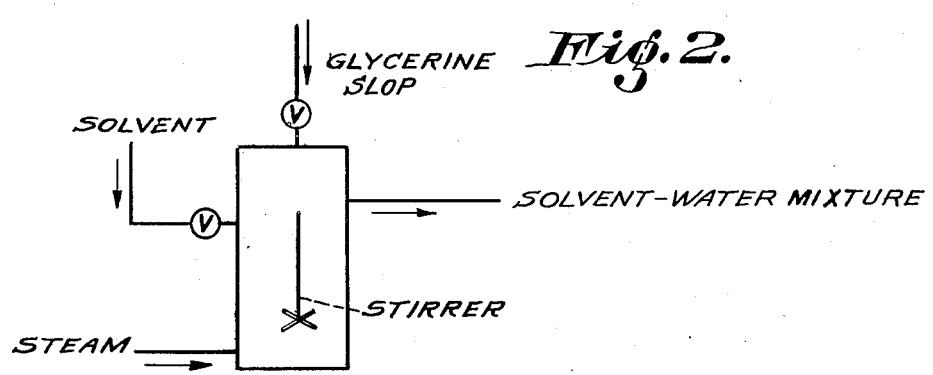

2,377,306

UNITED STATES PATENT OFFICE 2,377,306

RECOVERY OF GLYCEROL

Eric Harvey Brittain, Epsom Downs, and Walter Philip Joshua and John Marshall Whitmarsh, Epsom, England, assignors to The Distillers Company Limited, Edinburgh, Scotland, a British company Application April 14, 1941, Serial No. 388,550
In Great Britain April 26, 1940

1 Claim. (Cl. 202—42)

The present invention relates to the recovery of glycerine from fermented carbohydrate-containing materials and particularly to the recovery of the glycerine by solvent extraction.

It is known that glycerine is produced in small amounts in the alcoholic fermentation of sugars, starches and the like and it is known also to increase the amount of glycerine formed in the fermentation by so choosing the conditions that the formation of glycerine is favoured at the expense of the formation of ethyl alcohol; in either case the glycerine remains in the residual slop resulting from the distillation of the ethyl alcohol. Very considerable difficulties have been encountered in the recovery of the glycerine from the slop and various proposals have been made for the extraction of the glycerine by suitable solvents, including organic bases such as pyridine and aniline, aliphatic alcohols such as ethyl alcohol, butyl alcohol and the like and aliphatic esters and ethers. Usually the slop is concentrated or partially concentrated before extraction with the solvent.

It has been found, however, that the usual methods of solvent extraction, for example by counter-current extraction, can only be applied with difficulty for the recovery of glycerine in a form which can be worked up into pure glycerine or even into a product of saleable purity.

Flow sheets diagrammatically illustrating presently-preferred embodiments of the invention as hereinafter described in greater detail are shown on the accompanying sheet of drawings, wherein Fig. 1 diagrammatically represents one embodiment, and Fig. 2 diagrammatically represents a further embodiment.

According to the present invention a process for the recovery of glycerine from glycerine-containing aqueous solutions derived from the fermentation of carbohydrate-containing materials comprises forming a mixture of said aqueous solution with a solvent, or mixture of solvents, for glycerine and heating said mixture so as to distil off the water in admixture with the solvent or solvent mixture and to leave a substantially water-free solution of glycerine in said solvent or solvents. The solvents selected should be capable of forming an azeotropic mixture with water so that the water may be removed leaving a concentrated extract of solvent and glycerine, from which glycerine can be recovered by any suitable means.

Aliphatic alcohols such as the normal or secondary butyl alcohols and amyl alcohol or mixtures of these alcohols, have been found to be particularly suitable solvents, but other solvents for glycerine which form azeotropic mixtures with water can also be employed; normal butyl alcohol is, however, the preferred solvent.

The glycerine-containing solution, which may be partially concentrated slop, may, for example (Fig. 2 of the drawing), be introduced into the boiling solvent in finely divided condition, i. e., in the form of a thin stream or as a spray at such a rate that water is removed in the distillate at substantially the same rate as it is introduced in the form of slop concentrate. The quantity of the boiling solvent may be maintained substantially constant by feeding in solvent continuously at the rate at which it is removed by distillation of the azeotropic mixture. By this means only glycerine is extracted and compounds liable to contaminate the extracted glycerine are either carried over by the water which is removed or are precipitated.

When a suitable point is reached, the feed of concentrated slop is stopped and the distillation continued until the temperature at the head of the column is the boiling point of the dry solvent.

A further method (see Fig. 1 of the drawing) consists in mixing concentrated slop with the solvent, either hot or cold, and heating the whole to distil off a binary mixture of solvent and water. In both cases it is essential to agitate violently the mixture in the kettle during the distillation to ensure the precipitation of most of the impurities in the slop in the form of a granular powder, which can be easily separated by filtration.

It is not necessary to use a completely water-free solvent, and it is sometimes preferable to employ a solvent containing a small proportion of water. For example, when normal butyl alcohol is employed as the solvent, it is possible to use the butyl alcohol layer (containing about 16% of water) of the distillate obtained in a previous run.

The method may be applied either to the normal slop resulting from the alcoholic fermentation of molasses, sugars, starches and the like, or to slop resulting from fermentations carried out under conditions giving rise to increased glycerine formation. The amount of concentration of the slop required for carrying out the process will depend on the amount of glycerine present and on the original water content of the slop treated, but the concentrated slop should be in a form in which it can be readily sprayed into the boiling liquid and the amount of water present should not be such that it cannot be removed azeotropically at a reasonable rate.

The following example illustrates the recovery of glycerine from an ordinary alcohol distillery slop.

The slop, freed from yeast and other solid matter by clarification in a centrifugal separator, was concentrated in a vacuum evaporator until the specific gravity of the concentrate reached 1.252.

This concentrated slop contained 9.52% of glycerine by weight and had an acidity equivalent to 5.7% by weight of sulphuric acid.

The recovery of glycerine from this slop was carried out in the following manner:

84.5 pounds of the concentrated slop, containing 8.045 pounds of glycerine, were mixed in the cold with a mixture of 43½ gallons of dry normal butyl alcohol and 8½ gallons of water (that is to say, butyl alcohol containing 16% of water) and the whole mass was kept violently agitated in a steam-jacketed still-kettle.

On heating this mixture, the binary butyl alcohol-water mixture passed up the column and the separation of the condensate into two layers took place easily and rapidly. The lower layer, which consisted of water plus about 8% of butyl alcohol, was run to a storage tank, while the upper layer (wet butyl alcohol) was refluxed down the column. The vapour temperature during the initial stage of this operation was 92.3° C. and an indication that the dehydration was proceeding satisfactorily was given by a slight rise in that temperature. As the temperature rose, the water separation in the condensate became less and less, and more and more butyl alcohol was withdrawn from the system. This method of working was continued until the boiling point of dry butyl alcohol was reached. On attaining this boiling point, dry butyl alcohol was allowed to distil over for about half an hour and was withdrawn from the system, then the steam was shut off, the kettle contents were cooled under continuous agitation, and finally filtered. The weight of the filtered butyl alcohol solution obtained, amounting to 212 pounds, contained 3.275% by weight of glycerine. This is equal to 6.943 pounds of glycerine, or a recovery efficiency of 86.4%. The ratio of glycerine to impurity in the butyl alcohol solution was about 1:1.

The residue yielded, after washing with a small quantity of dry butyl alcohol and drying, a granular product which was quite non-hygroscopic, but which still contained about 3% of glycerine, equivalent to 12% of the glycerine in the slop concentrate treated. This figure can be reduced by more vigorous agitation of the slop and the butyl alcohol during the final stages of the dehydration and a higher recovery efficiency thereby obtained.

The wet butyl alcohol condensate obtained as above contains about 16% of water and can be re-used for the treatment of further supplies of concentrated slop.

Fig. 1 of the drawing diagrammatically illustrates the aforedescribed detailed examples.

What we claim is:

A process for the recovery of glycerine from the crude aqueous residue obtained from the fermentation by yeast of carbohydrate-containing materials and containing colloidal, semi-colloidal and crystallizable impurities, which comprises forming a mixture of said aqueous residue with an aliphatic alcohol selected from the class consisting of normal and secondary butyl alcohols, amyl alcohols and mixtures thereof and heating said mixture, whilst violently agitating the mixture, so as to distil off substantially all the water in admixture with said aliphatic alcohol, to precipitate the impurities in the said aqueous residue in the form of a granular powder and thereby to leave a substantially anhydrous solution of glycerine in said aliphatic alcohol in admixture with the granular precipitated impurities, and thereafter separating said glycerine solution from said granular precipitated impurities.

ERIC HARVEY BRITTAIN.
WALTER PHILIP JOSHUA.
JOHN MARSHALL WHITMARSH.